(12) United States Patent
Jhaveri

(10) Patent No.: US 12,263,472 B2
(45) Date of Patent: Apr. 1, 2025

(54) METHOD OF SUCTION OF UNWANTED GASES FROM A CHEMICAL REACTOR

(71) Applicant: Devang Jhaveri, Mumbai (IN)

(72) Inventor: Devang Jhaveri, Mumbai (IN)

( * ) Notice: Subject to any disclaimer, the term of this patent is extended or adjusted under 35 U.S.C. 154(b) by 19 days.

(21) Appl. No.: 18/156,675

(22) Filed: Jan. 19, 2023

(65) Prior Publication Data

US 2023/0149872 A1    May 18, 2023

Related U.S. Application Data

(63) Continuation of application No. PCT/IN2021/050591, filed on Jun. 18, 2021.

(30) Foreign Application Priority Data

Apr. 13, 2021 (IN) .............................. 202123017297

(51) Int. Cl.
B01J 3/00 (2006.01)
(52) U.S. Cl.
CPC ............... B01J 3/002 (2013.01); B01J 3/006 (2013.01)
(58) Field of Classification Search
CPC .................. B01J 3/00; B01J 8/00; B01J 8/06
USPC ...................................................... 220/89.1
See application file for complete search history.

(56) References Cited

U.S. PATENT DOCUMENTS

| | | | |
|---|---|---|---|
| 2004/0048938 A1 | 3/2004 | Mohedas et al. | |
| 2005/0000572 A1* | 1/2005 | Muller | F17D 1/005 137/561 A |
| 2005/0056593 A1* | 3/2005 | Erfan | B01D 46/2418 210/660 |
| 2005/0072357 A1* | 4/2005 | Shero | C23C 16/45544 118/726 |
| 2006/0286006 A1* | 12/2006 | McDaniel | C02F 3/342 366/241 |
| 2009/0308877 A1* | 12/2009 | David | B65D 51/1683 220/372 |
| 2011/0280769 A1 | 11/2011 | Yaluris et al. | |
| 2011/0303665 A1* | 12/2011 | Wilson | F16K 17/16 220/89.1 |
| 2013/0160882 A1* | 6/2013 | Johns | B01J 4/002 137/899 |
| 2023/0226514 A1 | 7/2023 | Jhaveri | |

FOREIGN PATENT DOCUMENTS

CN    211754918 U    10/2020

OTHER PUBLICATIONS

PCT/IN2021/050591 ; Written Opinion and Search Results of ISA Search; Dec. 21, 2021.

* cited by examiner

*Primary Examiner* — J. Gregory Pickett
*Assistant Examiner* — Niki M Eloshway
(74) *Attorney, Agent, or Firm* — Patent Law Agency, LLC; Peter Ganjian

(57) ABSTRACT

The present invention provides a highly effective method of removal of gases from the chemical reactor (01) by use of a suction unit employed near the inlet, outlet or both ends of the chemical reactor. The suction of entrapped air from the reaction mixture helps avoid fluctuation in the temperature or pressure requirement or formation of other by-products in the reaction mixture.

2 Claims, 4 Drawing Sheets

METHOD OF SUCTION OF UNWANTED GASES FROM A CHEMICAL REACTOR

CROSS-REFERENCE TO RELATED APPLICATIONS

This Application is a CONTINUATION application claiming the benefit of priority of the co-pending International Patent Application No. PCT/IN2021/050591 with an international filing date 18 Jun. 2021 that designated the United States, which claims the benefit of priority of the Republic of INDIA Patent Application No. 202123017297, filed 13 Apr. 2021, the entire disclosures of each (and all) of which Applications are expressly incorporated by reference in their entirety herein.

TECHNICAL FIELD OF INVENTION

The present invention generally relates to a method of removal of gases from a chemical reactor.

BACKGROUND

The present invention is in addition to the main patent application no. 202121003261 filed on Jan. 23, 2021 for invention titled "A METHOD OF CHEMICAL REACTION IN A HEAT EXCHANGER REACTOR". The present invention is a modification of the invention claimed in the complete specification of the main application under number 202121003261.

The conventional method of industrial chemical reaction is usually flowing the reactants in high-capacity reaction tubes and allowing the reactants to react in the reaction cylinder or to mix a reactant mixture in a container and pass it through the reaction cylinder. The known methods may include use of one or more static or dynamic stirrers. The most commonly used method for carrying out reaction is preparing the reaction mixture and then passing the mixture through shell and tube arrangement for the reaction to take place in presence or absence of a catalyst. However, gases can be produced as by-product during exothermic reactions which can hamper the progress of reaction by causing change in temperature, pressure, precipitation of reactant(s) or by-products in the reaction tube and there would be a need for constant monitoring and modulation of temperature and pressure of the reactants inside the reaction tube for carrying out the reaction successfully.

Objectives of Invention

The primary objective of the present invention is to provide a method for removal of unwanted gases from the chemical reactor.

Another objective of the present invention is to provide a method to carry out complex chemical reactions at constant temperatures and pressures.

Yet another objective of the present invention is to provide a method for continuous reaction with same efficiency.

These and other objects and advantages of the embodiments will become readily apparent from the following detailed description taken in conjunction with the accompanying drawings.

SUMMARY OF THE INVENTION

Before the present method is described, it is to be understood that this application is not limited to the method described, as there can be multiple possible embodiments which are not expressly illustrated in the present disclosure. It is also to be understood that the terminology used in the description is for the purpose of describing the version or embodiments only and is not intended to limit the scope of the present application.

Various embodiments of the present invention provides an air suction assembly for removal of unwanted gases from the chemical reactor assembly for highly efficient reaction of two or more reactants in a continuous manner and its method thereof.

In an embodiment, a chemical reactor having shell and tube type apparatus with a static and flexible turbulator as described in the main application is being employed for carrying our chemical reactions.

In another embodiment, the chemical reactor comprises of a suction assembly attached to the outlet end of the reactor assembly containing one or more screen for removal of gases. The reaction liquid that is collected along with the gas is re-entered into the reaction mixture. The gas removed from the reaction mixture by the suction unit is then re-circulated or removed and collected separately as required.

In yet another embodiment, the method comprises of a movement of the reactants from the inlet to the outlet end of the reactor assembly by passage through the turbulator.

In yet another embodiment, the method comprises of suction of the gases formed during the reaction and removal of such gases formed by help of the screen in the suction assembly.

In yet another embodiment, the reaction can be carried out in any of the following ways:
 i. Passing the reactants through the inlet and getting the product through the outlet after removal of the gases.
 ii. Passing the reactant mixture again through the reactor after removal of unwanted gases by using the suction assembly.

Figure 1:
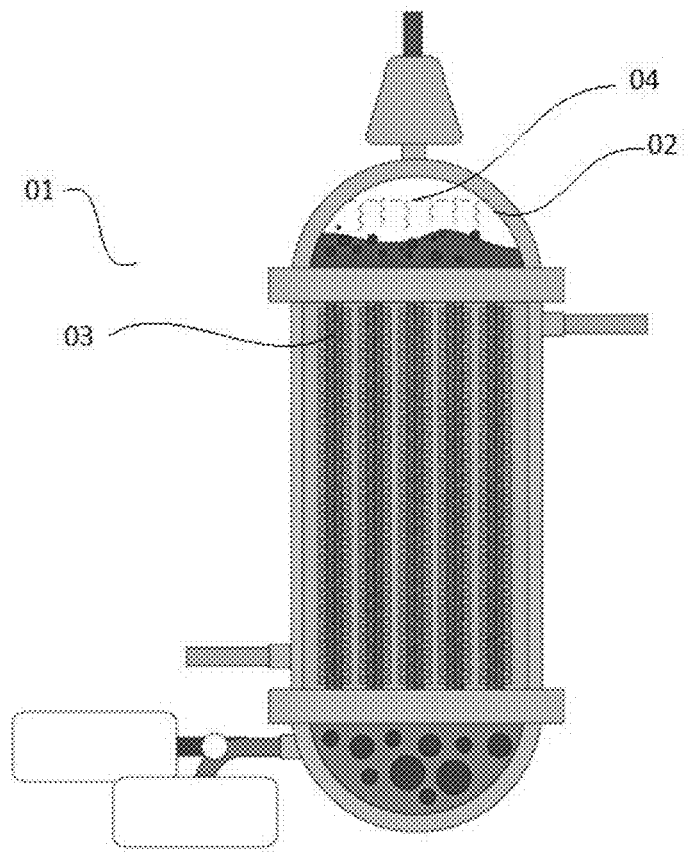
FIG. 1 illustrates a reactor assembly with a vacant chamber (02) containing a screen (04) and tube (03) containing the turbulator.
Figure 2:
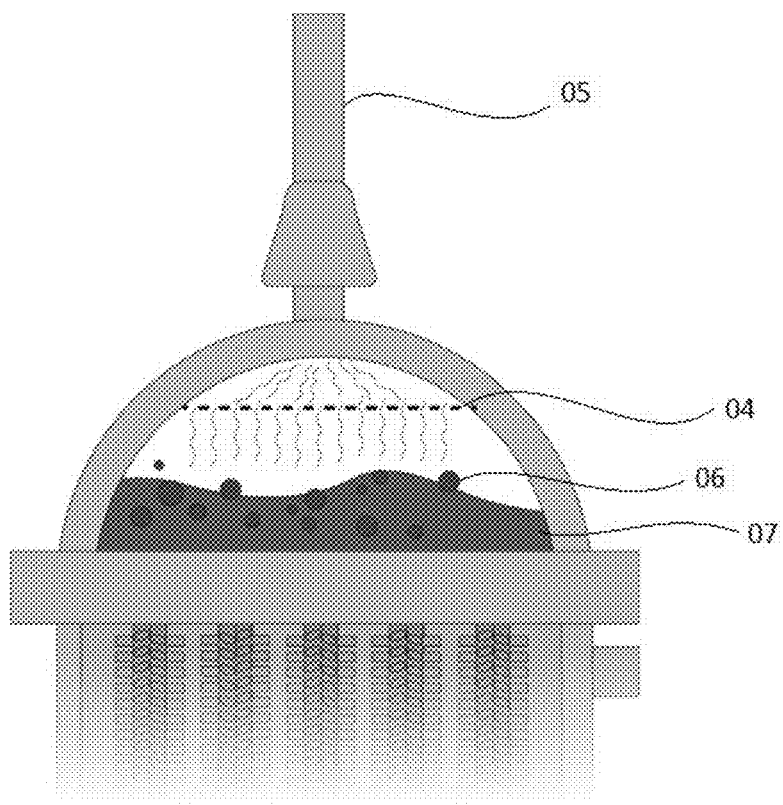
FIG. 2 illustrates a close up of the vacant chamber (02) containing screen (04) liquid (07), gases (06), gas transport pipe (05), and the suction assembly affixed to the chemical reactor (01).
Figure 3:
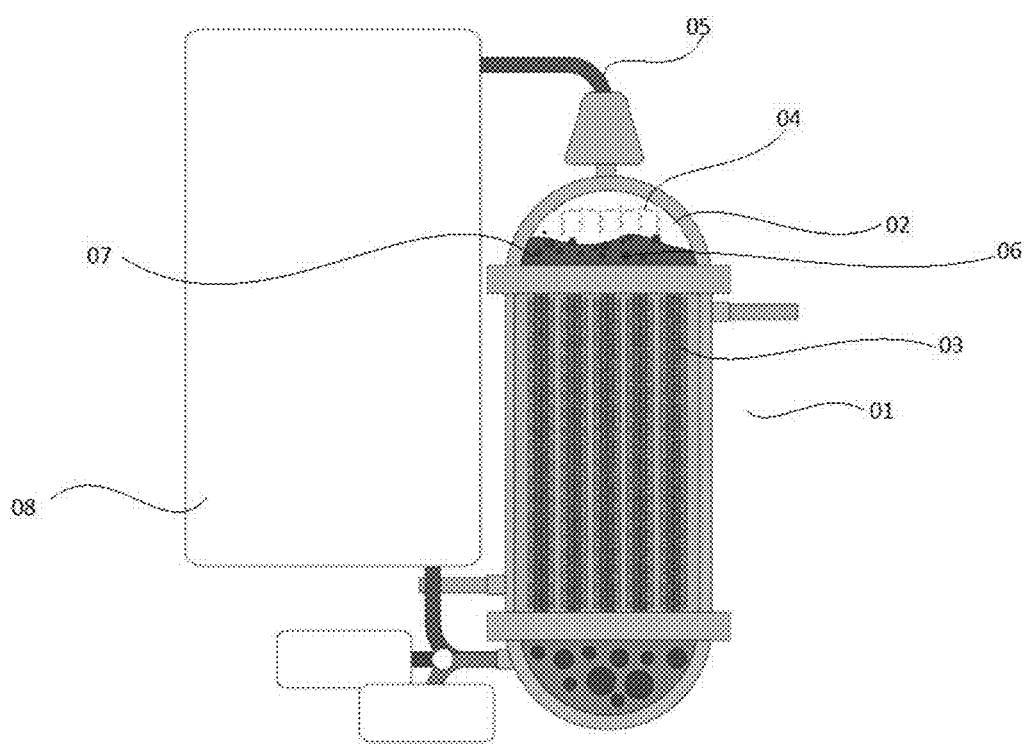
FIG. 3 illustrates a suction assembly affixed to a chemical reactor with a re-circulation tank (08) for re-circulation of reactant mixture back into the reactor.
Figure 4:
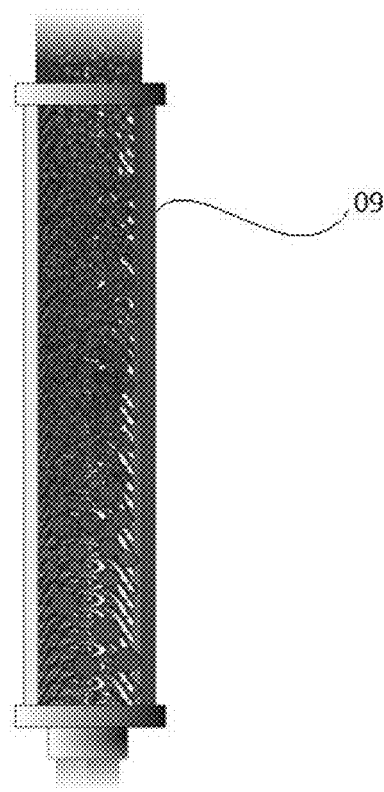
FIG. 4 illustrates a close up of the reaction tube (09) containing fin tube which breaks down bigger gas bubbles into smaller ones.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DETAILED DESCRIPTION OF THE DRAWINGS

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Various embodiments of the present invention provides a suction assembly for removing unwanted gases from the reaction mixture.

The terms "suction unit" and "vacuum pump" may be used interchangeably in the following detailed description. The words "reactor", "chemical reactor", "assembly", "reactor assembly" may be used interchangeably in the following detailed description. The words "reactants" "chemicals" "raw materials" may be used interchangeably in the following detailed description. The terms "thermal gradient" and "temperature gradient" may be used interchangeably in the following detailed description.

The following method is designed to provide for various applications in academia and industries requiring efficient chemical mixing and reactions of gas, liquids, solids, with or without catalysts undergoing exothermic or endothermic reactions.

The following method is designed to carry out chemical reactions in the reactor efficiently by use of suction assembly to remove the unwanted gas generated as by-product which may be caused as a result of exothermic reactions in the chemical reactor. Presence of entrapped gas in the chemical reaction mixture may cause varying of several factors such as temperature, pressure, rate of reaction, precipitation or caking of reactants or by products, etc. Thus, the entrapped gas bubbles in the reaction mixture are removed by use of a suction unit and the liquid is separated from the gas by use of a screen.

In yet another embodiment, the flexible turbulator used is designed to reduce the size of gas bubbles inside the reaction mixture in the tube and avoid coagulation of the bubbles.

In one embodiment of the present invention, suction unit is attached to the chemical reactor (1) either near the inlet end of the chemical reactor or the outlet end of the chemical reactor or both ends, if required. The suction unit is usually attached near the outlet end of the chemical reactor to remove any gases formed immediately after addition of reactants in the same chamber. The suction assembly is attached to the outlet end of the reactor in order to remove the unwanted gases formed in the reaction mixture as by-product of exothermic reaction. The rate of removal of the entrapped gases is controlled by the presence of control valves present on the tube of the suction assembly. The unwanted gas is then collected in a separate container which can be used or discarded based on requirement of the reaction.

In another embodiment of the present invention, the reaction mixture is circulated back into the reactor for further mixing and further removal of gases formed during the reaction and the process is repeated until the final product is achieved.

Although the embodiments herein are described with various specific embodiments, it will be obvious for a person skilled in the art to practice the invention with modifications. However, all such modifications are deemed to be within the scope of the claims.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the claims.

Advantages of the Invention

The present invention discloses an efficient method of chemical reaction by removal of unwanted gas produced as a result of chemical reaction. Removal of such unwanted gas reduces variation of temperature and pressure and risk of unwanted by products being formed in the reaction tube.

I claim:

1. A method of suction of gas from the reaction mixture, comprising:
    feeding reactants to a lower chamber of a reactor;
    positioning reaction tubes having a static and flexible turbulator inside a middle chamber of the reactor;
    moving the reactants from the lower chamber and into the reaction tubes;
    generating chemical reactions within the reaction tubes, resulting in gas byproducts;
    providing a generally constant temperature and pressure for continuous and efficient chemical reactions by forcefully removing the gas byproducts via a screen positioned within a vacant chamber of an upper chamber of the reactor by a suction-force of a suction unit;
    wherein the forced suction and forced removal of the gas byproducts commences at a time of initial mixing of the reactants in the lower chamber; and
    wherein the forced suction and forced removal of the gas byproducts continues during the chemical reaction.

2. A reactor, comprising:
    a lower chamber;
    a middle chamber; and
    an upper chamber;
    external reactant feeds are connected to an exterior side of the lower chamber that feed one or more reactants into the lower chamber;
    the middle chamber facilitates reaction of the received reactants, with the middle chamber including:
    reaction tubes having a static and flexible turbulator;
    the reaction tubes having a bottom end that is connected to the lower chamber, and a top end that is connected to the upper chamber;
    the reactants received from the lower chamber traverse through interiors of the reaction tubes, generating a chemical reaction therein that results in a liquid byproduct and a gas byproduct that egress the top end of the reaction tubes and into the upper chamber;
    the upper chamber defines a vacant chamber that houses a screen, with the screen enabling only the passage of the gas byproduct; and
    an external suction unit connected to an exterior side of the upper chamber that facilitates forced removal of the gas byproduct via the screen from the vacant chamber to thereby enable continuous and efficient chemical reactions of reactants at a generally constant temperatures and pressures;
    the forced removal of the gas byproduct by a suction-force of the suction unit commences at a time of initial mixing of the reactants in the lower chamber, and continues during the chemical reaction;

wherein: the gas byproduct forcibly removed by the suction-force of the suction unit via the screen is transported via a gas pipe to a recirculation tank.

\* \* \* \* \*